US010020954B2

(12) United States Patent
Li et al.

(10) Patent No.: US 10,020,954 B2
(45) Date of Patent: Jul. 10, 2018

(54) GENERIC PACKET ENCAPSULATION FOR VIRTUAL NETWORKING

(71) Applicant: Futurewei Technologies, Inc., Plano, TX (US)

(72) Inventors: Renwei Li, Fremont, CA (US); Lin Han, San Jose, CA (US); Katherine Zhao, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 128 days.

(21) Appl. No.: 15/076,273

(22) Filed: Mar. 21, 2016

(65) Prior Publication Data

US 2016/0323184 A1 Nov. 3, 2016

Related U.S. Application Data

(60) Provisional application No. 62/154,164, filed on Apr. 29, 2015.

(51) Int. Cl.
*H04L 29/06* (2006.01)
*H04L 12/28* (2006.01)
*H04L 12/931* (2013.01)
*H04W 72/04* (2009.01)
*H04L 12/741* (2013.01)
*H04L 12/713* (2013.01)
*H04L 12/751* (2013.01)

(52) U.S. Cl.
CPC .............. *H04L 12/28* (2013.01); *H04L 45/02* (2013.01); *H04L 45/586* (2013.01); *H04L 69/22* (2013.01)

(58) Field of Classification Search
CPC ....... H04L 12/28; H04L 45/586; H04L 45/02; H04L 69/22
See application file for complete search history.

(56) References Cited

U.S. PATENT DOCUMENTS

| 2014/0064150 A1* | 3/2014 | Finn .................. H04L 45/48 370/256 |
| 2016/0149808 A1* | 5/2016 | Cai .................... H04L 67/10 370/395.53 |

(Continued)

OTHER PUBLICATIONS

Li, R., et al., U.S. Appl. No. 14/728,821, 33 pgs., "Distribution of Internal Routes for Virtual Networking," filed Jun. 2, 2015.

*Primary Examiner* — Brian D Nguyen
(74) *Attorney, Agent, or Firm* — Conley Rose, P.C.

(57) ABSTRACT

A method implemented by network element (NE) configured as a local cloud switch point (CSP), the method comprising receiving a first post message from a remote CSP via a cloudcasting network, wherein the first post message indicates a remote virtual extensible network (VXN) identifier (ID) of a remote virtual network attached to the remote CSP, receiving a first data packet from a local virtual network attached to the local CSP, wherein the first data packet is associated with the remote virtual network, performing encapsulation on the first data packet to produce a first encapsulated data packet by selecting an encapsulation header for the first data packet based on the remote VXN ID and not based on network protocols of the local virtual network and the remote virtual network, and sending the first encapsulated data packet to the remote CSP.

20 Claims, 11 Drawing Sheets

(56) References Cited

U.S. PATENT DOCUMENTS

| | | | |
|---|---|---|---|
| 2016/0198501 A1* | 7/2016 | Verkaik | H04W 76/022 |
| | | | 370/329 |
| 2016/0210209 A1* | 7/2016 | Verkaik | G06F 11/2033 |
| 2016/0211989 A1* | 7/2016 | Jain | H04L 12/4633 |
| 2016/0274926 A1* | 9/2016 | Narasimhamurthy | G06F 9/45558 |
| 2016/0285761 A1* | 9/2016 | Dong | H04L 12/4666 |
| 2016/0320827 A1* | 11/2016 | Ou Yang | G06F 1/3206 |

* cited by examiner

GENERIC PACKET ENCAPSULATION FOR VIRTUAL NETWORKING

CROSS-REFERENCE TO RELATED APPLICATIONS

The present application claims priority to U.S. Provisional Patent Application 62/154,164 filed Apr. 29, 2015 by Renwei Li, et al., and entitled "Generic Packet Encapsulation For Virtual Networking," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cloud computing utilizes a shared pool of configurable resources. The computing environment including the shared pool of resources is referred to as a cloud or a cloud network. The resources may be virtual instances of resources executing on virtual machines (VMs). The shared pool of resources may include computing resources, storages, and applications. The computing environment or cloud may adapt to an increase in service usage by providing additional resource instances to the pool. The shared pool of resources may reside internal to a private enterprise network or as part of a public network. The shared pool of resources may reside across one or more networks operating under one or more networking domains.

SUMMARY

In one embodiment, the disclosure includes a method implemented by network element (NE) configured as a local cloud switch point (CSP), the method comprising receiving, via a receiver at the local CSP, a first post message from a remote CSP via a cloudcasting network, wherein the first post message indicates remote virtual routing information associated with a remote virtual network attached to the remote CSP, and wherein the remote virtual routing information indicates a remote virtual extensible network (VXN) identifier (ID) that identifies the remote virtual network in the cloudcasting network, receiving, via the receiver, a first data packet from a local virtual network attached to the local CSP, wherein the first data packet is associated with the remote virtual network, performing, via a processor of the NE, encapsulation on the first data packet to produce a first encapsulated data packet by selecting an encapsulation header for the first data packet based on the remote VXN ID and not based on network protocols of the local virtual network and the remote virtual network, and sending, via a transmitter at the local CSP, the first encapsulated data packet to the remote CSP to facilitate data transportation between the local virtual network and the remote virtual network across the cloudcasting network. In some embodiments, the disclosure also includes wherein the remote virtual routing information further indicates a plurality of virtual network elements (VNEs) in the remote virtual network, and wherein the method further comprises generating, via the processor, a mapping between the remote CSP and the remote virtual routing information of the remote virtual network received from the first post message, determining, via the processor, that a destination of the first data packet corresponds to a first VNE of the plurality of VNEs in the remote virtual network according to the remote virtual routing information in the mapping, and obtaining, via the processor, the remote VXN ID from the mapping for performing the encapsulation after determining that the destination corresponds to the first VNE, and/or wherein performing the encapsulation on the first data packet comprises generating a generic virtual extensible network encapsulation (GVE) header according to the remote VXN ID of the remote virtual network, and encapsulating the first data packet with the GVE header to produce the first encapsulated data packet, and/or wherein the GVE header comprises a VXN ID field indicating the VXN ID of the remote virtual network, and wherein the VXN ID field comprises a length of twenty-eight bits, and/or further comprising generating, via the processor, a carrier protocol header according to a network address of the remote CSP and a carrier protocol of the cloudcasting network, and encapsulating, via the processor, the first encapsulated data packet with the carrier protocol header prior to sending the first encapsulated data packet to the remote CSP, and/or wherein the carrier protocol corresponds to an Ethernet protocol, an Internet protocol (IP), or a multiprotocol label switching (MPLS) protocol, and/or further comprising receiving, via the receiver, a second encapsulated data packet from the remote CSP, wherein the second encapsulated data packet comprises an encapsulation header indicating an encapsulated VXN ID corresponding to a local VXN ID of the local virtual network, removing, via the processor, the encapsulation header from the second encapsulated data packet to produce a second data packet, and sending, via the transmitter, the second data packet to the local virtual network, and/or further comprising sending, via the transmitter, a second post message to the remote CSP to indicate a plurality of VNEs in the local virtual network and the local VXN ID prior to receiving the second encapsulated data packet, wherein a destination of the second data packet corresponds to one of the VNEs in the local virtual network, and/or wherein the first data packet is an Internet protocol version four (IPv4) packet, an IP version six (IPv6) packet, a virtual extensible local area network (VXLAN) packet, a VXLAN-generic protocol extension (VXLAN-GPE) packet, a generic routing encapsulation (NVGRE) packet, or a multiprotocol label switching (MPLS) packet, or a locator/identifier separation protocol (LISP) packet.

In another embodiment, the disclosure includes a computer program product comprising computer executable instructions stored on a non-transitory computer readable medium such that when executed by a processor cause a local CSP to receive, via a receiver, a first post message from a remote CSP via a cloudcasting network, wherein the first post message indicates a remote virtual network ID that identifies a remote virtual network attached to the remote CSP, receive, via the receiver, a first data packet from a local virtual network attached to the local CSP, wherein the first data packet is directed to a destination in the remote virtual network, generate a first encapsulation header according to the remote virtual network ID indicated in the first post message, encapsulate the first data packet according to the first encapsulation header to produce a first encapsulated data packet, and send, via a transmitter, the first encapsulated data packet to a remote CSP associated with the remote virtual network via the cloudcasting network. In some embodiments, the disclosure also includes wherein the first post message comprises virtual routing information of the remote virtual network indicating the remote virtual network ID and a plurality of VNEs in the remote virtual network, and wherein the computer executable instructions when executed by the processor further cause the local CSP to generate a mapping between the remote CSP and the virtual routing information of the remote virtual network received from the route message, determine that the destination corresponds to a first VNE of the plurality of VNEs in the remote virtual network according to the virtual routing information in the mapping, and obtain the remote virtual network ID from the mapping for generating the first encapsulation header after determining that the destination corresponds to the first VNE, and/or wherein the computer executable instructions when executed by the processor further cause the local CSP to generate a carrier protocol header according to a network address of the remote CSP and a carrier protocol of the cloudcasting network, and encapsulate the first encapsulated data packet with the carrier protocol header prior to sending the first encapsulated data packet to the remote CSP, and/or wherein the carrier protocol is independent of a network layer protocol of the local virtual network, and wherein the network layer protocol comprises a multiprotocol label switching (MPLS) protocol, and/or wherein the local virtual network, the remote virtual network, and the cloudcasting network are associated with different physical networks, and wherein the local virtual network and the remote virtual network correspond to portions of a common virtual network, and/or wherein the computer executable instructions when executed by the processor further cause the local CSP to send, via the transmitter, a second post message to the remote CSP to indicate virtual routing information of the local virtual network, wherein the virtual routing information indicates a local virtual network ID that identifies the local virtual network in the cloudcasting network, receive, via the receiver, a second encapsulated data packet from the remote CSP, wherein the second encapsulated data packet comprises a second encapsulation header indicating an encapsulated virtual network ID, determine that the encapsulated virtual network ID corresponds to the local virtual network ID of the local virtual network, remove the encapsulation header from the second encapsulated data packet to produce a second data packet, and send, via the transmitter, the second data packet to the local virtual network according to the determining of the encapsulated virtual network ID.

In yet another embodiments, the disclosure includes a network element (NE) configured to implement a local CSP, the NE comprising a receiver configured to receive a first post message from a first remote CSP via a cloudcasting network, wherein the first post message indicates remote virtual routing information associated with a first remote virtual network attached to the first remote CSP, and wherein the remote virtual routing information indicates a first remote VXN ID that identifies the first remote virtual network in the cloudcasting network, and receive a first data packet from a first local virtual network attached to the local CSP, wherein the first data packet is associated with the first remote virtual network, a processor coupled to the receiver and configured to determine that the first data packet is associated with the first remote virtual network according to the remote virtual routing information, and perform a first encapsulation on the first data packet according to the first remote VXN ID to produce a first encapsulated data packet, and a transmitter coupled to the processor and configured to send the first encapsulated data packet to the first remote CSP. In some embodiments, the disclosure also includes further comprising a memory coupled to the processor and configured to store a mapping between the first remote CSP and the remote virtual routing information received from the first post message, wherein the remote virtual routing information further indicates a plurality of VNEs in the first remote virtual network, and wherein the processor is further configured to determine that a destination of the first data packet corresponds to a first VNE of the VNEs in the first remote virtual network according to the remote virtual routing information in the mapping, and obtain the first remote VXN ID from the mapping for performing the first encapsulation after determining that the destination corresponds to the first VNE, and/or wherein the receiver is further configured to receive a second data packet from a second local virtual network attached to the local CSP, wherein the second data packet is destined to a second remote virtual network attached to a second remote CSP in the cloudcasting network, wherein the second remote virtual network is identified by a second remote VXN ID in the cloudcasting network, wherein the second data packet and the first data packet comprise different network protocols, wherein the processor is further configured to perform a second encapsulation on the second data packet according to the second remote VXN ID to produce a second encapsulated data packet, wherein the first encapsulation and the second encapsulation are associated with a same encapsulation type, and wherein the transmitter is further configured to send the second encapsulated data packet to the second remote CSP, and/or wherein the receiver is further configured to receive a third encapsulated data packet from the first remote CSP, wherein the third encapsulated data packet comprises an encapsulation header indicating an encapsulated VXN ID corresponding to a local VXN ID of the first local virtual network, wherein the processor is further configured to remove the encapsulation header from the third encapsulated packet to produce a third data packet, and wherein the transmitter is further configured to send the third data packet to the first local virtual network, and/or wherein the processor is further configured to obtain the local VXN ID for identifying the first local virtual network in the cloudcasting network, wherein the transmitter is further configured to send a second post message to the first remote CSP to indicate a plurality of VNEs in the first local virtual network and the local VXN ID prior to receiving the second encapsulated data packet, and wherein a destination of the second data packet corresponds to one of the VNEs in the first local virtual network.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
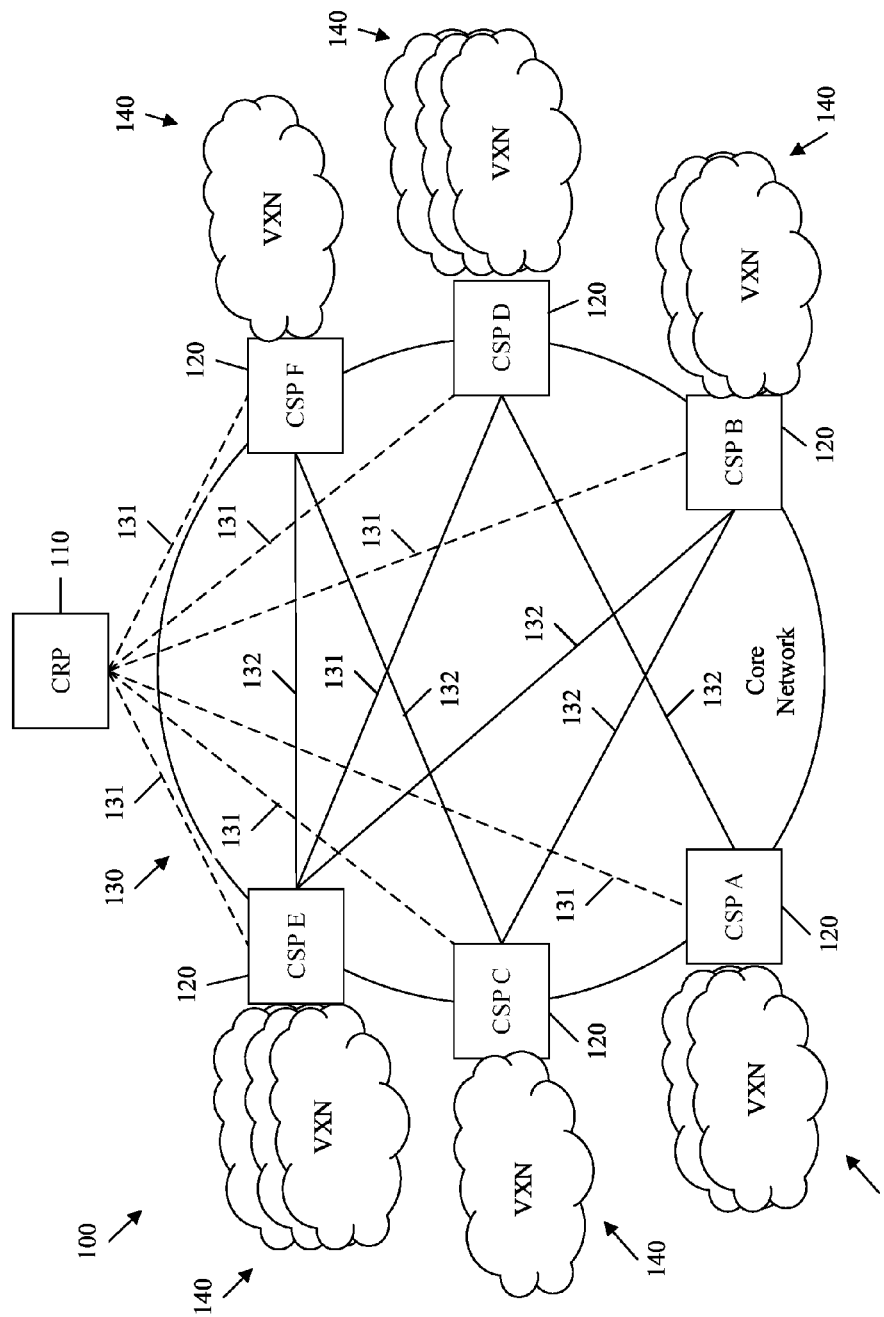
FIG. 1 is a schematic diagram of an embodiment of a cloudcasting network system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Cloud, cloud computing, and/or cloud services may refer to a group of servers, storages, computers, laptops, cell phones, and/or any other types of network devices connected together by an Internet protocol (IP) network and sharing network resources. One of the challenges for cloud computing is network virtualization. Network virtualization is the process of combining hardware and software network resources and network functionality into a single, software-based virtual network.

Some examples of network virtualization technologies are virtual extensible local area network (VXLAN), VXLAN-generic protocol extension (GPE), network virtualization using generic routing encapsulation (NGVRE), and multi-protocol label switching (MPLS). VXLAN was developed to enable large-scale cloud computing by encapsulating media access control (MAC)-based open system interconnection (OSI) layer 2 (L2) Ethernet frames within OSI layer 4 (L4) user datagram protocol (UDP) packets. A VXLAN encapsulation header is used to indicate a virtual network identifier (VNI) for identifying a certain virtual network. VXLAN allows up to about 16 millions of virtualized L2 segments overlaid on top of an IP/UDP network.

VXLAN-GPE extends VXLAN to allow encapsulation of Internet protocol (IP) or OSI layer 3 (L3) packets in addition to Ethernet frames. A VXLAN-GPE encapsulation header is used to indicate a VNI and an inner protocol or a payload protocol. Similar to VXLAN, VXLAN-GPE allows up to about 16 millions of virtualized L2 and/or L3 segments overlaid on top of an IP/UDP network.

NVGRE is a tunneling scheme that uses generic routing encapsulation (GRE) routing protocol as defined by Internet engineering task force (IETF) documents request for comments (RFC) 2784 and RFC 2890. NVGRE provides network isolation for a multi-tenant data center (DC) by using a tenant network identifier (TNI) to identify a particular tenant work. NVGRE allows up to about 16 millions of virtualized L2 segments to span over physical L3 networks. However, NVGRE is limited to tunneling Ethernet frames over IP networks.

MPLS utilizes path labels to identify paths in a network. Data packets are encapsulated with path labels and data forwarding devices forward data traffic based on path labels instead of addresses in a routing table. MPLS tunnels Ethernet frames and IP packets embedded in Ethernet and IP protocols over a physical network. To use MPLS for network virtualization, certain path labels are dedicated to identify a particular virtual network segment.

The IETF initiated a network virtualization overlays (NVO3) working group to study and develop more advanced and/or alternative network virtualization mechanisms and protocols. However, the IETF NVO3 currently focuses on data plane and leverages Ethernet virtual private network (EVPN) control plane, which is based on a border gateway protocol (BGP) protocol.

Cloudcasting is an emerging network routing and forwarding technology that enables devices connected to the same cloud network or virtual network to communicate with each other. However, a cloud network may be built over a networking infrastructure that is shared among multiple cloud networks. For example, a cloud network comprises multiple portions distributed over geographically dispersed locations and inter-connected by the networking infrastructure. The networking infrastructure may be administered by multiple service providers. The networking infrastructure and the cloud network may execute the same network protocol or different network protocols. In addition, multiple cloud networks may be linked together to provide a particular service. Thus, intra-virtualized-network communication and inter-virtualized-network communication are employed for cloudcasting. Although VXLAN, VXLAN-GPE, NVGRE, and MPLS provide network virtualizations and some amount of tunneling mechanisms, VXLAN, VXLAN-GPE, NVGRE, and MPLS are each limited to operate over certain OSI layers and may not easily support spanning any virtual networks over any networking infrastructure. Cloudcasting may employ a single and unified methodology to control multi-tenancy datacenter, inter-datacenter communication, and hybrid-cloud interconnect.

Disclosed herein are various embodiments of a unified cloudcasting network architecture and mechanisms to interconnect geographically dispersed virtual networks of any virtualization network type to communicate with each other over a networking infrastructure of any transport protocol and/or any overlay technology. A cloudcasting network comprises a cloud rendezvous point (CRP) and a plurality of cloud switch points (CSPs). Each CSP acts as an access point for one or more VXNs or clouds. Each CSP sends attached VXNs' identification information to the CRP. VXN identification information comprises a VXN number and/or a VXN name. The CRP distributes the CSP and associated VXNs' identification information to other CSPs in the network. The CSPs exchange virtual routing information of directly attached VXNs with other CSPs. Virtual routing information of a VXN comprises routes, route types, and network addresses of VMs located internally to the VXN. When a local CSP receives user data packets CSP from an attached VXN, the local CSP encapsulates the received user data packet with a GVE header. The GVE header is set to carry the VXN number of the destination VXN at which the destination of the user data packet is located. The CSP further encapsulates the GVE encapsulated packet with a carrier network header to form a first packet. The carrier network header comprises information to reach a destination CSP at which the destination VXN is attached to. When the destination CSP receives the first packet, the destination CSP determines a destination VXN according to the GVE header, decapsulates the first packet to obtain the original user data packet, performs any other types of encapsulation according to the VXN's encapsulation protocol to form a second packet, and delivers the second packet to the destination VXN. The GVE is independent from the underlying physical carrier network, the carrier network protocol, or the VXNs' protocols. The disclosed embodiments are suitable for use as a hybrid-cloud interconnect. The disclosed embodiments may be applied to a DC interconnect network to interconnect geographically dispersed multi-tenancy DCs.

FIG. 1 is a schematic diagram of an embodiment of a cloudcasting network system 100. The system 100 comprises a CRP 110 and a plurality of CSPs 120 shown as CSP A, CSP B, CSP C, CSP D, CSP E, and CSP F. The CRP 110 and the CSPs 120 form the functional elements of the system 100. The CRP 110 and the CSPs 120 are communicatively coupled to each other via a core network 130. The underlying physical network of the core network 130 may be any type of transport network such as an electrical network and/or an optical network. The core network 130 may employ any transport protocols such as IP, Ethernet, or another suitable protocol for transporting data over the core network 130. In addition, the core network 130 may employ any network virtualization, network overlay, and tunneling technologies such as MPLS. The core network 130 may operate under one or more networking administrative domains provided by one or more service providers. The underlying physical network operates independent of the transport protocol and is transparent to any network virtualization, network overlay, tunneling technologies, the CRP 110, and the CSPs 120. The system 100 further comprises a plurality VXNs 140. Each VXN 140 is physically or logically attached to one of the CSP A2. Each VXN 140 is an overlay network, which may be built on top of a L2 network or a L3 network. Some examples of network overlay technologies may include VXLAN, VXLAN-GPE, NVGRE, MPLS, and locator/identifier separation protocol (LISP). The network protocols of the VXNs 140 and the core network 130 are independent of each other and are transparent to each other. The VXNs 140 may comprise virtual networking resources such as VMs, storages, applications, and any other virtual NE (VNE) suitable for providing network services. The VXNs 140 may further comprise virtual switches (vSwitches) configured to route traffic between the virtual networking resources. The VXNs 140 may employ cloud computing technologies to share the networking resources among multiple users or tenants. The VXNs 140 are also referred to as user clouds. The VXNs 140 are distributed over geographical disperse sites. Cloudcasting enables communications between the distributed VXNs 140. The system 100 may be configured as shown or alternatively configured as determined by a person of ordinary skill in the art to achieve similar functionalities.

The operations of the system 100 are divided into a control plane and a data plane. The control plane employs a cloudcasting control protocol (CCC) to control and manage cloudcasting-related operations such as auto-discovery, registrations, and route information exchange as described in the U.S. patent application Ser. No. 14/728,821 by Renwei Li, et al., and titled "Distribution of Internal Routes for Virtual Networking," ("'821 Application"), which is incorporated by reference. The data plane employs a GVE protocol for data forwarding in the core network 130. As shown, the CRP 110 communicates with the CSPs 120 over a plurality of first links 131 for auto-discovery and registrations, and the CSPs 120 communicate with each other over a plurality of second links 132 for route information exchange and data forwarding. The first links 131 and the second links 132 may comprise physical links and/or logical links.

The CRP 110 may comprise one or more VMs, servers, and/or network devices configured to control and manage the CSPs 120. The CRP 110 comprises a global view of the CSPs 120 and corresponding VXNs 140 attached to the CSPs 120. For example, the CSPs 120 are identified by network addresses such as Internet protocol version four (IPv4) addresses and Internet protocol version six (IPv6) addresses, and the VXNs 140 are identified by VXN numbers and VXN names that are unique in one or more CCC domains operating on the core network 130. The CRP 110 maintains a CSP information base comprising mappings between the network addresses of the CSPs 120 and the VXN numbers and VXN names of corresponding attached VXNs 140. The CRP 110 operates in the control plane of the system 100. The CRP 110 enforces CSPs 120 authentication, participate in CSPs 120 auto-discovery, and/or any other CCC operations. For example, the CRP 110 exchanges register message and report messages with the CSPs 120 during CCC operations, as described more fully below. It should be noted that, while one CRP 110 is depicted in system 100, multiple CRPs 110 may be employed in any suitable configuration such as a hierarchical configuration and a cluster configuration.

The CSPs 120 may comprise one or more VMs, servers, and/or network devices configured to perform both control plane functions and data plane functions in the system 100. The CSPs 120 function as access points or interconnection points between the distributed VXNs 140. For example, the CSPs 120 are physically or logically located at edges of the VXNs 140. The CSPs 120 are data plane gateways that interface clouds (e.g., the VXNs 140) to a physical network (e.g., the core network 130). Each CSP A20 maintains a CSP-VXN mapping DB comprising mappings between other remote CSPs 120 in the network 130 and corresponding attached VXNs 140. For example, each mapping comprises a network address of a remote CSP, a list of VXN numbers identifying VXNs 140 that are attached to the remote CSP, and virtual routing information associated with corresponding VXNs 140. In the control plane, each CSP A20 performs auto-discovery and registration with the CRP 110 and exchanges VXN and virtual routing information with other CSPs 120. In the data plane, the CSPs 120 performs encapsulation and decapsulation according to a GVE protocol to forward data traffic between the VXNs 140.

In operation, when a CSP A20 is powered up, the CSP A20 performs auto-discovery to discover the CRP 110. After performing auto-discovery, the CSP A20 begins registration with the CRP 110 by sending a register message to the CRP 110 to provide information associated with the CSP A 20 (e.g., network address) and attached VXNs 140 (e.g., VXN numbers and VXN names). The CRP 110 responds with a report message indicating other remote CSPs 120 in the system 100 and corresponding attached VXNs 140.

After registration, the CSP A 20 exchange virtual routing information associated with attached VXNs 140 with the remote CSPs 120 indicated in the report message. The CSPs 120 may obtain or collect information of nodes and routes internal to the attached VXNs 140 prior to the route exchange, for example, by employing an interior gateway protocol (IGP), a border gateway protocol (BGP), or a label distribution protocol (LDP). The CRP 110 stores CSP information received from the CSPs 120 in the CSP information base. Each CSP A 20 stores CSP information received from the CRP 110, and virtual routing information received from the remote CSPs 120 in the CSP-VXN mapping DB.

After route exchange, the CSPs 120 may begin data plane processing. During data plane operation, an encapsulation CSP A 20 receives a user data packet from an attached VXN 140, performs GVE according to a VXN number of a destination VXN 140 at which a destination of the user data packet is located, and forwards the encapsulated data packets to a destination CSP A 20 at which the destination VXN 140 is attached to. A decapsulation CSP A 20 receives a GVE-encapsulated data packet from a corresponding CSP A 20, performs GVE decapsulation, and forwards the decapsulated data packet to a corresponding attached VXN 140. The control plane and data plane operations are described more fully below.

In an embodiment, the system 100 is deployed in a DC interconnect network comprising a plurality of DCs provisioning resources for a plurality of virtual networks or tenant networks distributed across multiple geographical sites. For example, a tenant network comprises one portion located at a VXN 140 attached to the CSP A 120 and a second portion located at another VXN 140 attached to the CSP D 120. Thus, the CCC control and data forwarding mechanisms described above enable communication between dispersed portions of a common virtual network or a common tenant network. In such an embodiment, the CSPs 120 and the CRP 110 may be located at DCs, for example, at servers, top of rack (ToR) switches, end of row (EoR) switches, virtual switches (vSwitches), or any other physical NEs or virtual components of the DCs.

Figure 2:
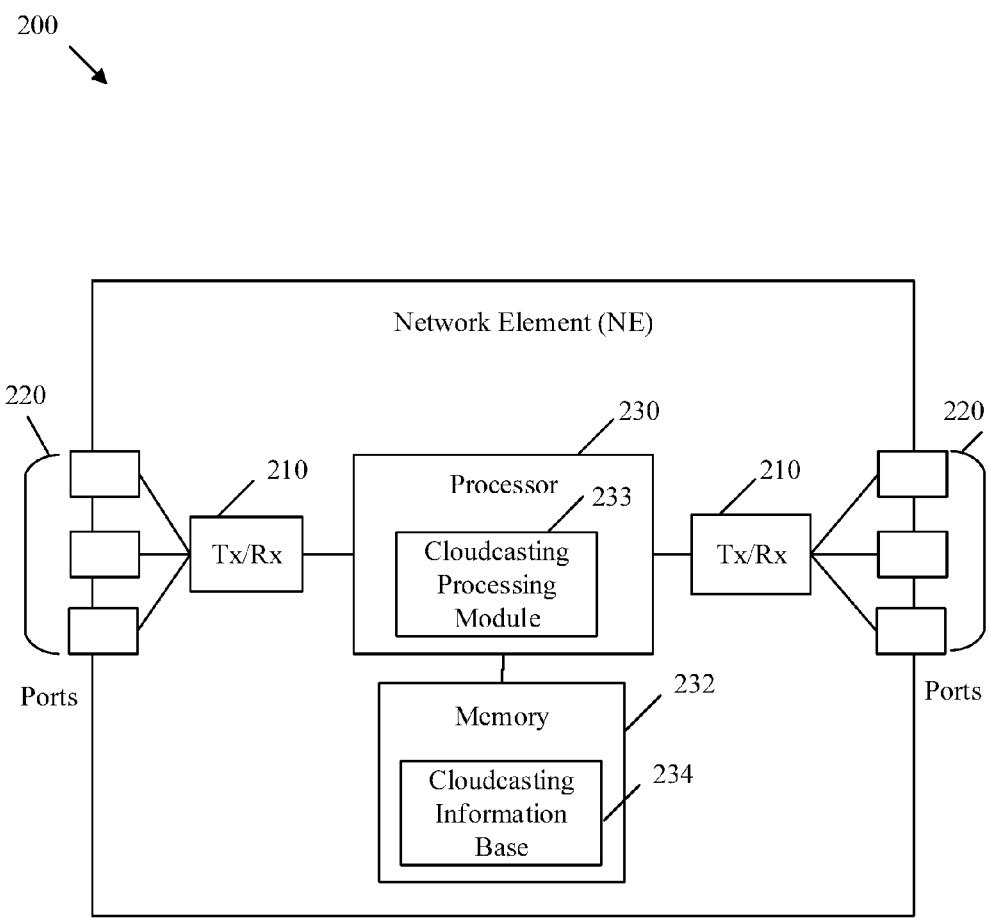
FIG. 2 is a schematic diagram of an embodiment of a network element (NE) within a network.

FIG. 2 is a schematic diagram of an embodiment of an NE 200 within a network such as the system 100. For example, NE 200 may act as a CRP 110, a CSP A 20, and/or any other node in the system 100. NE 200 may be configured to implement and/or support the CCC and data forwarding mechanisms and schemes described herein. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments.

At least some of the features/methods described in the disclosure are implemented in a network apparatus or component, such as an NE 200. For instance, the features/methods in the disclosure may be implemented using hardware, firmware, and/or software installed to run on hardware. The NE 200 is any device that transports packets through a network, e.g., a switch, router, bridge, server, a client, etc. As shown in FIG. 2, the NE 200 comprises transceivers (Tx/Rx) 210, which may be transmitters, receivers, or combinations thereof. The Tx/Rx 210 is coupled to a plurality of ports 220 for transmitting and/or receiving frames from other nodes.

A processor 230 is coupled to each Tx/Rx 210 to process the frames and/or determine which nodes to send the frames to. The processor 230 may comprise one or more multi-core processors and/or memory devices 232, which may function as data stores, buffers, etc. The processor 230 may be implemented as a general processor or may be part of one or more application specific integrated circuits (ASICs) and/or digital signal processors (DSPs). The processor 230 comprises a cloudcasting processing module 233, which may perform CCC and GVE and may implement methods 1200, 1300, 1400, and 1500, as discussed more fully below, and/or any other flowcharts, schemes, and methods discussed herein. As such, the inclusion of the cloudcasting processing module 233 and associated methods and systems provide improvements to the functionality of the NE 200. Further, the cloudcasting processing module 233 effects a transformation of a particular article (e.g., the network) to a different state. In an alternative embodiment, the cloudcasting processing module 233 may be implemented as instructions stored in the memory device 232, which may be executed by the processor 230.

The memory device 232 may comprise a cache for temporarily storing content, e.g., a random-access memory (RAM). Additionally, the memory device 232 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 232 is configured to store a cloudcasting information base 234, which may comprise network information associated with the CSPs 120 and the VXNs 140 depending on the embodiments.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g., a computer program product stored in a non-transitory medium/memory) may be viewed as a particular machine or apparatus.

Figure 3:
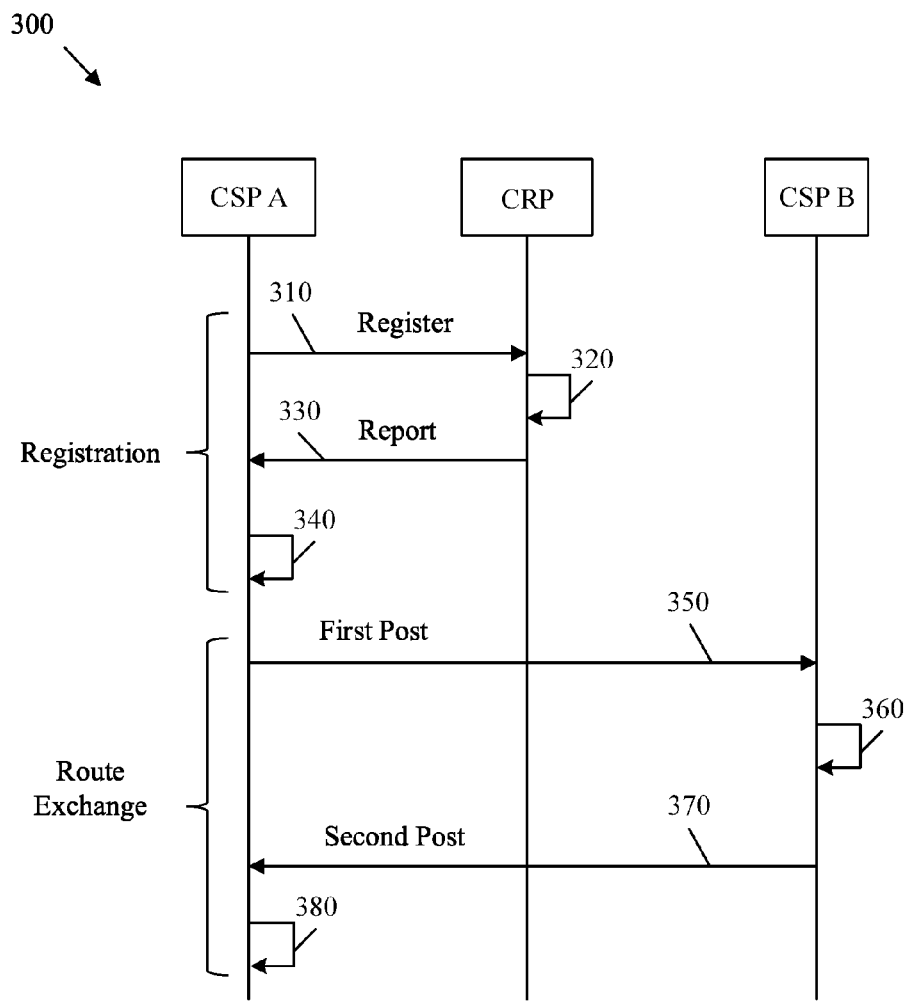
FIG. 3 is a protocol diagram of an embodiment of a method for performing registration and route exchange in a cloudcasting network system.

FIG. 3 is a protocol diagram of an embodiment of method 300 for performing registration and route exchange in a cloudcasting network system such as the system 100. The method 300 is implemented by a first CSP shown as CSP A, a second CSP shown as CSP B, and a CRP. CSP A and CSP B are similar to the CSPs 120. The CRP is similar to the CRP 110. The method 300 is initiated when CSP A powers on or attaches to a new virtual network such as the VXN 140. At step 310, CSP B begins registration with the CRP by sending a register message to the CRP. The register message comprises CSP A's network address and VXN information associated with each VXN attached to CSP A. For example, CSP A's address may be an IPv4 address, an IPv6 address, or a media access control (MAC) address depending on the network layer protocol in use by the core network such as the core network 130 of the system. The VXN information indicates a VXN name and/or a VXN number that uniquely identify a corresponding VXN in one or more CCC domains of the system 100. In some embodiments, the register message may also comprise a CSP A's ID, which may be a string or a number, and/or an indication of any other VXNs that CSP A is interested in. At step 320, upon receiving the register message, the CRP saves the data received from the register message in a CSP information base, for example, in a memory device such as the memory device 232.

At step 330, in response to the register message, the CRP sends a report message to CSP A. The report message indicates information associated with other CSPs in the system and VXN information of corresponding VXNs. The CSP information indicates network addresses of the other CSPs. The VXN information indicates VXN names and/or VXN numbers identifying the VXNs attached to the other CSPs. In an embodiment, the CRP includes information associated with CSPs that are of interest to CSP A. As an example, the report message indicates information associated with CSP B (e.g., CSP B's address) and corresponding VXNs (e.g., VXN number). In an embodiment, a VXN attached to CSP A and a VXN attached to CSP B are portions of a common VXN such as a tenant network. In such an embodiment, the CRP may simultaneously send a report message to CSP B indicating that CSP A shares a common VXN with CSP B along with CSP A's network address. At step 340, upon receiving the report message, CSP A saves the CSP information and the VXN information in a CSP-VXN mapping DB, for example, stored in a memory device.

At step 350, after registration, CSP A begins route exchange by sending a first post message to CSP B according to CSP B's address received from the report message. The first post message indicates virtual routing information of VXNs attached to CSP A. The virtual routing information comprises VXN numbers and/or VXN names of corresponding VXNs, routes, route types such as address family identifiers (AFIs) and subsequent AFIs (SAFIs), and network addresses such as IP addresses and MAC addresses of VMs and VNEs located in the corresponding VXNs. In an embodiment, when a first of the VXNs attached to CSP A shares a common VXN with a first of the VXNs attached to CSP2, CSP A may only indicate virtual routing information associated with the attached first VXN that shares the common VXN. At step 360, upon receiving the first post message, CSP B saves the virtual routing information in association with CSP A in a local CSP-VXN mapping DB of CSP B.

At step 370, in response to the first post message, CSP B sends a second post message to CSP A. The second post message indicates virtual routing information associated with VXNs attached to the CSP B. In an embodiment, when a first of the VXNs attached to CSP A shares a common VXN with a first of the VXNs attached to CSP2, CSP B may only indicate virtual routing information of the attached first VXN that shares the common VXN. At step 380, upon receiving the second post message, CSP A saves the VXN and route information in association with CSP B in a local CSP-VXN mapping DB of CSP A. It should be noted that the method 300 may be applied to a cloudcasting network system with any number of CSPs. After completing registration and route exchange, CSP A and CSP B may proceed to operate data plane functions.

Figure 4:
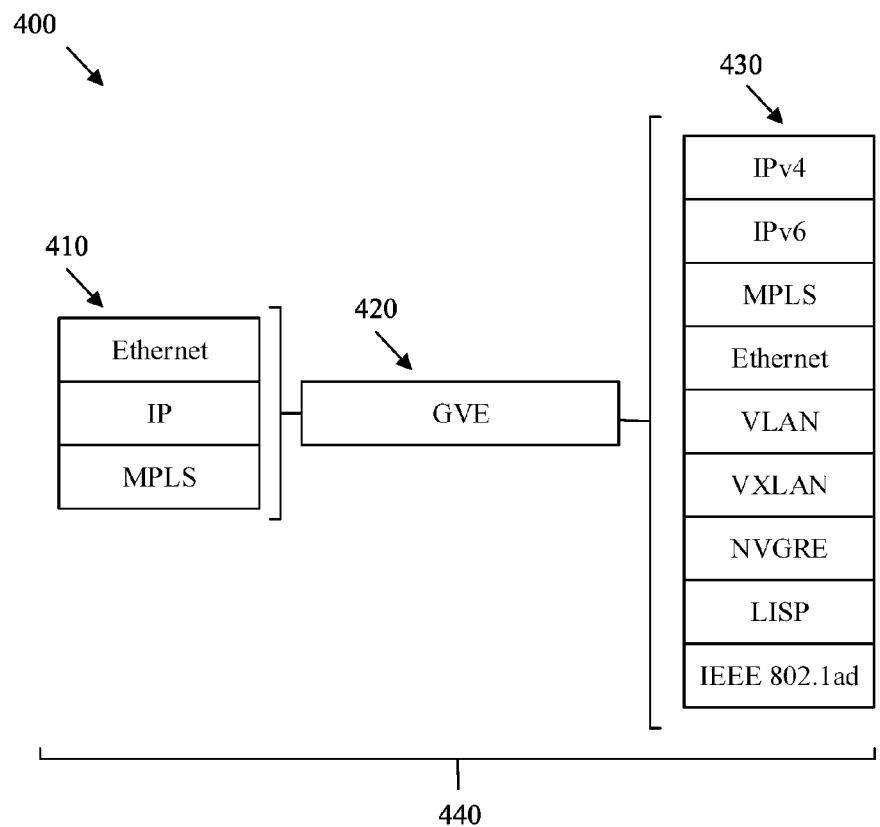
FIG. 4 is a schematic diagram of an embodiment of a method for performing generic virtual extensible network (VXN) encapsulation (GVE) in a cloudcasting network system.

FIG. 4 is a schematic diagram of an embodiment of a method 400 for performing GVE in a cloudcasting network system such as the system 100. The method 400 is implemented by a CSP such as the CSPs 120 and the NE 200. The method 400 is implemented after the CSP completed registration with a CRP such as the CRP 110 and exchanged route information with other CSPs in the system and generated a CSP-VXN mapping DB. For example, the CSP may employ the method 300 for registration and route exchange or any other suitable protocols such as the IGP, the BGP, and the LDP. The method 400 begins when the CSP, acting as a source CSP, receives a user data packet 430 from an attached VXN such as the VXNs 140.

The user data packet 430 carries user data that is originated from a source located in the attached VXN. The user data packet 430 is formatted according to a network protocol in use by the source VXN. As shown, the user data packet 430 may be an IPv4 packet, an IPv6 packet, an Ethernet packet, a virtual local area network (VLAN) packet, a VXLAN packet, an NVGRE packet, a MPLS packet, a LISP packet, an Institute of Electrical and Electronics Engineer (IEEE) 802.1 ad packet, or any other network protocol packet.

Upon receiving the user data packet 430, the source CSP determines a destination of the user data packet 430. The source CSP searches the CSP-VXN mapping DB to find a match for the destination. For example, the user data packet 430 indicates a destination address such as an IP address or a MAC address and source CSP searches the virtual routing information in the CSP-VXN mapping DB. When a match is found, the source CSP obtains the VXN number of a destination VXN where the destination is located and a network address of a destination CSP attached to the destination VXN. After finding a match, the source CSP generates a GVE header 420 according to the VXN number and encapsulates the user data packet 430 with the GVE header 420.

After encapsulating the user data packet 430 with the GVE header 420, the source CSP generates a carrier protocol header 410 based on a carrier protocol or a network layer protocol of a core network such as the core network 130 that connects the source CSP to the other CSPs. For example, the carrier protocol may be Ethernet, IPv4, IPv6, MPLS, or any other type of network protocol suitable for transporting packets in the core network. When the carrier protocol is IPv4 or IPv6, the carrier protocol header 410 comprises IPv4 or IPv6 addresses of the source CSP and the destination CSP, respectively. When the carrier protocol is Ethernet, the carrier protocol header 410 comprises MAC addresses of the source CSP and the destination CSP. When the carrier protocol is MPLS, the carrier protocol header 410 comprises one or more path labels that indicate a path between the source CSP and the destination CSP. After generating the carrier protocol header 410, the source CSP attaches the carrier protocol header 410 to the GVE header 420 to produce a transport packet 440 and sends the transport packet 440 to the destination CSP. The source CSP may further attach other headers such as an Ethernet header to the transport packet 440 before sending to the destination CSP. To support the method 400, a network packet type or protocol number definition is required to indicate that transport packet 440 comprises an encapsulation type of GVE. When the carrier protocol is Ethernet or VLAN, a new Ether type may be assigned by the IEEE to indicate a protocol of the payload in an Ethernet packet, where the Ether type is carried in a packet header of the Ethernet packet. When the carrier protocol is IPv4 or IPv6, a new protocol number may be assigned by Internet Assigned Number Association (IANA) to indicate a protocol of the payload in an IPv4 or IPv6 packet, where the protocol number is carried in a packet header of the IPv4 or IPv6 packet.

When the destination CSP receives the transport packet 440, the destination CSP performs decapsulation to remove the carrier protocol header 410 and the GVE header 420 and forwards the user data packet 410 to the destination VXN. It should be noted that the method 400 is also suitable for use with other network control protocols such as IGP, BGP, and LDP in addition to the CCC described in the method 300. In addition, the method 400 is suitable for use as an overlaying technology between two geographically distributed IP networks or Ethernet networks instead of virtual networks. Further, the method 400 may be applied to VXNs of GVE type.

Figure 5:
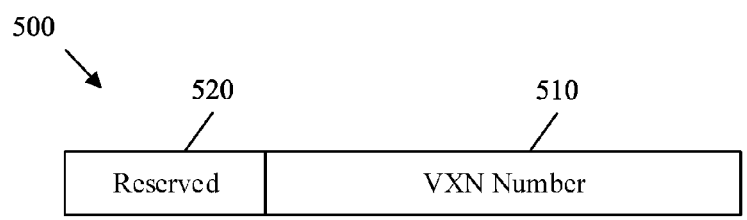
FIG. 5 is a schematic diagram of an embodiment of a GVE header.

FIG. 5 is a schematic diagram of an embodiment of a GVE header 500. The GVE header 500 is similar to the GVE header 420 and illustrates more details of the GVE header 420. The GVE header 500 comprises a VXN number field 510 and a reserved field 520. The VXN number field 510 is about twenty-eight bits long and identifies a virtual network such as the VXNs 140 in a cloudcasting network system such as the system 100. The reserved field 520 is about four bits long and is reserved for future use. For example, a CSP such as the CSP A 20 allocates VXN numbers to VXNs that are attached to the CSP during CCC operations. The CSP communicates the VXN numbers of the attached VXNs to a CRP such as the CRP 110 and other CSPs in the system by employing the method 400.

Figure 6:
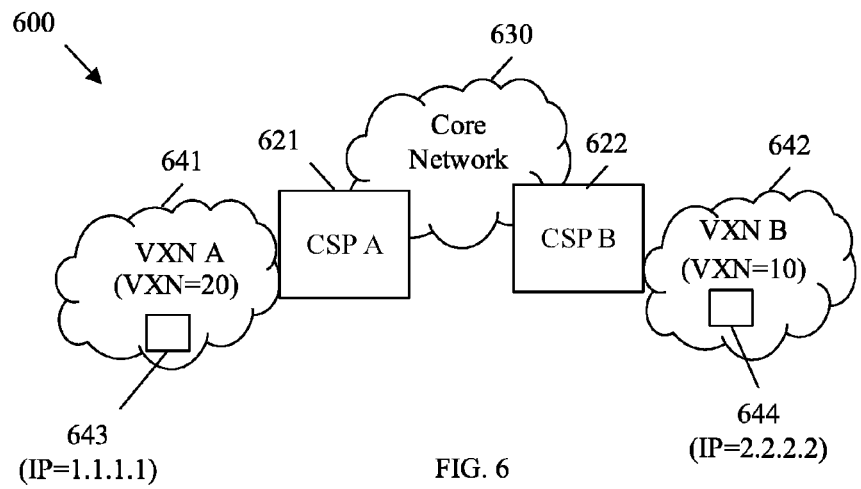
FIG. 6 a schematic diagram of a portion of a cloudcasting network system.

FIGS. 6-11 illustrate various embodiments of a cloudcasting scenario in a cloudcasting network system 600 similar to the system 100. FIG. 6 is a schematic diagram of a portion of the cloudcasting network system 600. As shown, the cloudcasting network system 600 comprises a CSP A 621 and a CSP B 622 similar to the CSPs 120 communicatively coupled to a core network 630 similar to the core network 130. The system 600 further comprises a VXN A 641 and a VXN B 642 similar to the VXNs 140 attached to the CSP A 621 and a VXN B 642, respectively. As shown, the VXN A 641 is identified by a VXN number of 20 and comprises a VNE 643 with an IP address of 1.1.1.1. The VXN B 641 is identified by a VXN number of 10 and comprises a VNE 644 with an IP address of 2.2.2.2. The VNEs 643 and 644 may be any virtual networking devices executing on VMs and/or servers.

Figure 7:
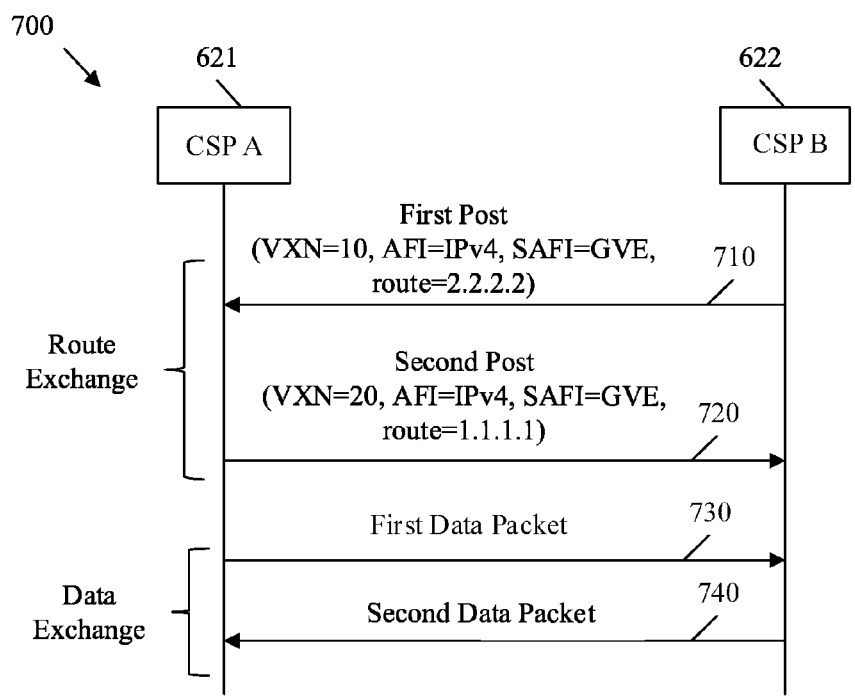
FIG. 7 illustrates a method of exchanging data in a cloudcasting network system.

FIG. 7 illustrates a method 700 of exchanging data in the cloud casting network system 600. The method 700 begins after the CSP A 621 and the CSP B 622 completed registration with a CRP such as the CRP 110 by employing the steps of 310-340 in the method 300. The CSP A 621 and the CSP B 622 employ similar route exchange mechanisms as described in the method 300 and similar data forwarding mechanisms as described in the method 400. At step 710, the CSP B 622 sends a first post message to the CSP A 621. The first post message comprises virtual routing information associated with the VXN B 642. The virtual routing information indicates the VXN number (e.g., VXN=10) that identifies the VXN B 642 in the system 600, an AFI (e.g., AFI=IPv4) for routing data in the VXN B 642, an SAFI (e.g., SAFI=GVE) used for reaching the VXN B 642, and a route to the VNE 644 (e.g., route=2.2.2.2). For example, the IANA assigns a new SAFI type value to represent GVE. Upon receiving the first post message, the CSP A 621 stores the virtual routing information in association with the CSP B 622 in a CSP-VXN mapping DB, as described more fully below.

At step 720, the CSP A 621 sends a second post message to the CSP B 622. The second post message comprises virtual routing information associated with the VXN A 641. The virtual routing information indicates the VXN number (e.g., VXN=20) for the VXN A 641, an AFI (e.g., AFI=IPv4) for routing data in the VXN A 641, an SAFI (e.g., SAFI=GVE) used for reaching the VXN A 641, and a route to the VNE 643 (e.g., route=1.1.1.1). Similarly, upon receiving the second post message, the CSP B 622 stores the virtual routing information in a CSP-VXN mapping DB. In an embodiment, the VXN A 641 and the VXN B 642 are VXLAN networks each identified by a VNI in a domain independent of a CCC domain of the system 600. In such an embodiment, the first post message and the second post message each includes the corresponding VNI. The value of a VNI and the value of a VXN number for a VXN may be different, but comprises a one-to-one mapping.

At step 730, the CSP A 621 forwards a first encapsulated data packet comprising similar format as the transport packet 440 to the CSP B 622. For example, the CSP A 621 receives a first user data packet similar to the user date packet 430 from the VXN A 641, where the user data packet is originated from the VNE 643 (e.g., IP source address=1.1.1.1) and destined to the VNE 644 (e.g., IP destination address=2.2.2.2). The CSP A 621 parses the first user data packet, determines a destination VNE, a destination CSP, and an encapsulation protocol for the destination CSP according to the CSP-VXN mapping DB. The CSP A 621 generates the first encapsulated data packet by encapsulating the first user data packet with a GVE header similar to the GVE headers 420 and 500 and a carrier protocol header similar to the carrier protocol header 410. The GVE header indicates the VXN number (e.g., VXN number=10) of the destination VXN, the VXN B 642. The details of the first encapsulated data packet are described more fully below.

When the CSP B 622 receives the first data packet from CSP A 621, the CSP B 622 extracts the original first user data packet received by the CSP A 621, forms a second data packet from the extracted first user data packet according to a protocol format employed by the VXN B 642 and sends the second data packet to the VXN B 642. At step 740, the CSP B 622 forwards a second encapsulated data packet comprising a similar format as the transport packet 440 and the first encapsulated data packet to the CSP A 621. The details of the second encapsulated data packet are described more fully below.

Figure 8:
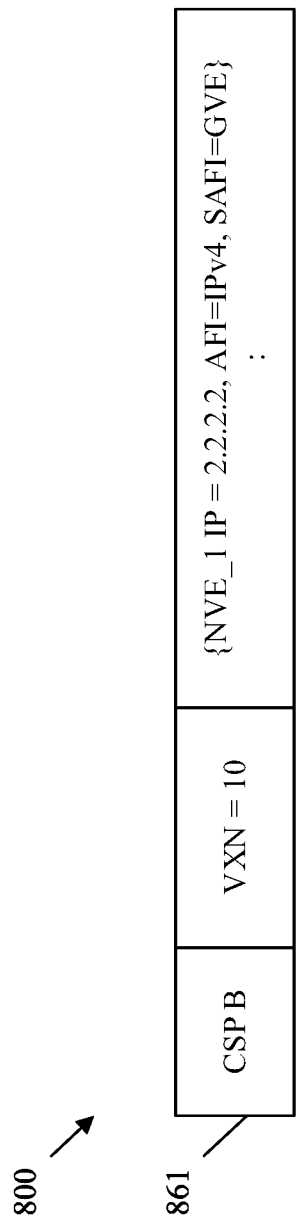
FIG. 8 illustrates an embodiment of a CSP-to-virtual extensible network (CSV-VXN) mapping database (DB).

FIG. 8 illustrates an embodiment of a CSP-VXN mapping DB 800. The DB 800 corresponds to the CSP-VXN mapping DB generated by the CSP A 621 after the first post message is received at step 710. As shown, the DB 800 comprises a mapping 861 for the CSP B 622, where the mapping 861 stores the VXN number, the AFI, the SAFI, the routes, and the CSP B 622's network address in association with the CSP B 622. The mapping 861 may comprise virtual routing information of other VXNs attached to the CSP A 621 and the DB 800 may comprise other mappings 861 for other CSPs in the system 600.

Figure 9:
FIG. 9 illustrates another embodiment of a CSP-VXN mapping DB.

FIG. 9 illustrates another embodiment of a CSP-VXN mapping DB 900. The DB 900 corresponds to the CSP-VXN mapping DB generated by the CSP B 622 after the second post message is received at step 720. The DB 900 is similar to the DB 800, but includes CSP and virtual routing information of the CSP A 621 instead of CSP B 622.

Figures 10, 11:
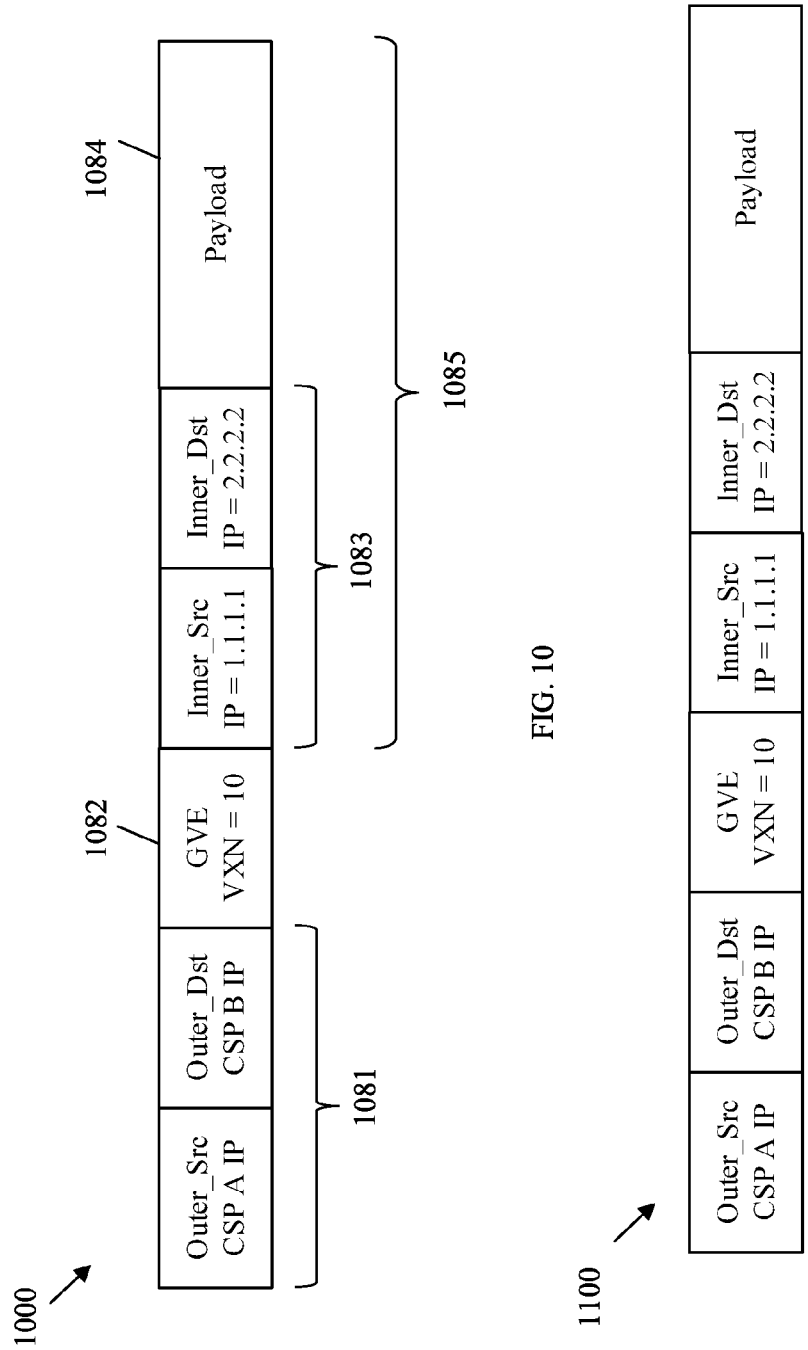
FIG. 10 illustrates an embodiment of a transport packet transported in a cloudcasting network system.
FIG. 11 illustrates another embodiment of a transport packet transported in a cloudcasting network system.

FIG. 10 illustrates an embodiment of a transport packet 1000 transported in the cloudcasting network system 600. The transport packet 1000 corresponds to the first encapsulated data packet sent by the CSP A 621 at step 730. The transport packet 1000 comprises a similar format as the transport packet 440. The transport packet 1000 comprises an outer header 1081, a GVE header 1082, and a user data packet 1085 comprising an inner header 1083 and a payload 1084. The user data packet 1085 corresponds to the first user data packet originated from the VXN A 641. The outer header 1081 is similar to the carrier protocol header 410. For example, the core network 630 is an IP network. Thus, the outer header 1081 indicates that the destination CSP address is CSP A 621's IP address and the source CSP address is CSP B 622's IP address. The GVE header 1082 is similar to the GVE headers 420 and 500 and indicates that the destination VXN is the VXN B 642 (e.g., VXN=10). The inner header 1083 indicates that the source of the payload 1084 is the VNE 644 (e.g., IP=2.2.2.2) and the destination of the payload 1084 is the VNE 643 (e.g., IP=1.1.1.1). It should be noted that the CSP A 621 may further attach other network protocol headers to the transport packet 1000 for transmission.

FIG. 11 illustrates another embodiment of a transport packet 1100 transported in the cloudcasting network system 600. The transport packet 1100 corresponds to the second encapsulated data packet sent by the CSP B 622 at step 740. The transport packet 1100 comprises a similar format as the transport packets 440 and 1000.

Figure 12:
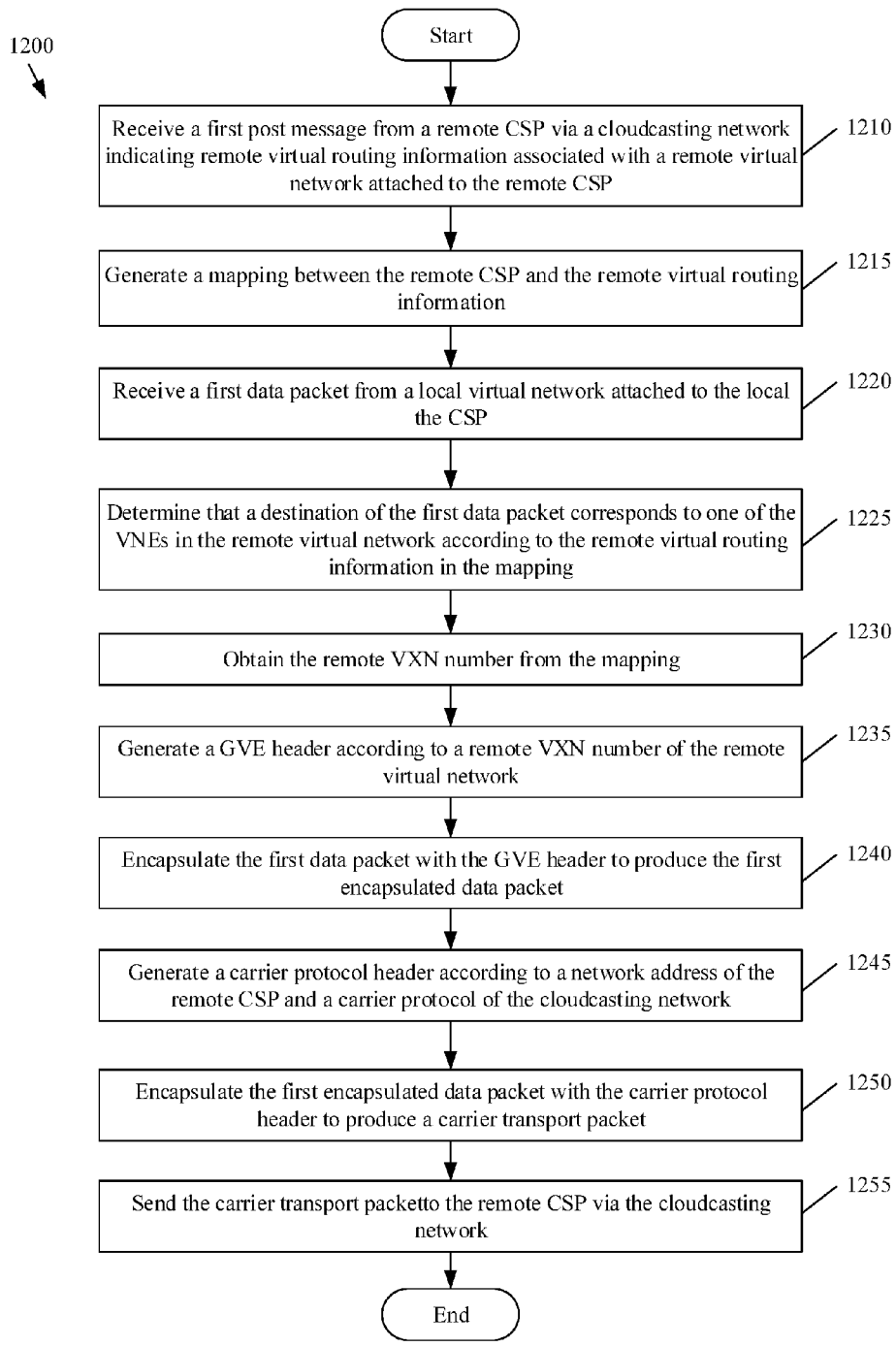
FIG. 12 is a flowchart of an embodiment of a method for performing encapsulation.

FIG. 12 is a flowchart of an embodiment of method 1200 for performing encapsulation. The method 1200 is implemented by a local CSP such as the CSPs 120, 621, and 622 and the NE 200 in a cloudcasting network such as the network systems 100 and 600. The method 1200 employs similar mechanisms as the methods 400 and 700. The method 1200 is implemented after the local CSP registered with a CRP such as the CRP 110 by employing the method 300. For example, the local CSP obtained information associated with other CSPs in the network such as the network addresses of the other CSPs and corresponding attached virtual networks such as the VXNs 140, 641, and 642. At step 1210, a first post message is received from a remote CSP via a cloudcasting network such as system 100. The first post message indicates remote virtual routing information associated with a remote virtual network attached to the remote CSP. The first post message is similar to the first post message sent in the step 710 and the second post message sent in the step 720. The remote virtual routing information indicates routes to reach a plurality of VNEs such as the VNEs 643 and 644 in a remote virtual network attached to the remote CSP and a remote VXN number that uniquely identifies the remote virtual network in the cloudcasting network. At step 1215, a mapping between the remote CSP and the remote virtual routing information is generated. The mapping is similar to the CSP-VXN mapping DBs 800 and 900.

At step 1220, a first data packet similar to the user data packet 430 and 1085 is received from a local virtual network attached to the local CSP. At step 1225, a determination is made that the first data packet corresponds to one of the VNEs in the remote virtual network according to the remote virtual routing information in the mapping. At step 1230, the remote VXN number of the remote virtual network is obtained from the mapping.

At step 1235, a GVE header similar to the GVE headers 420, 500, and 1082 is generated according to the remote VXN number of the remote virtual network obtained at the step 1230. At step 1240, the first data packet is encapsulated with the GVE header to produce a first encapsulated data packet.

At step 1245, a carrier protocol header similar to the carrier protocol headers 410 and 1081 is generated according to a network address of the remote CSP and a carrier protocol (e.g., IP, Ethernet, and MPLS) of the cloudcasting network. At step 1250, the first encapsulated data packet is encapsulated with the carrier protocol header to produce a carrier transport packet similar to the transport packets 440, 1000, and 1100. At step 1255, the carrier transport packet is sent to the remote CSP via the cloudcasting network according to the mapping between the remote CSP and the remote virtual network.

Figure 13:
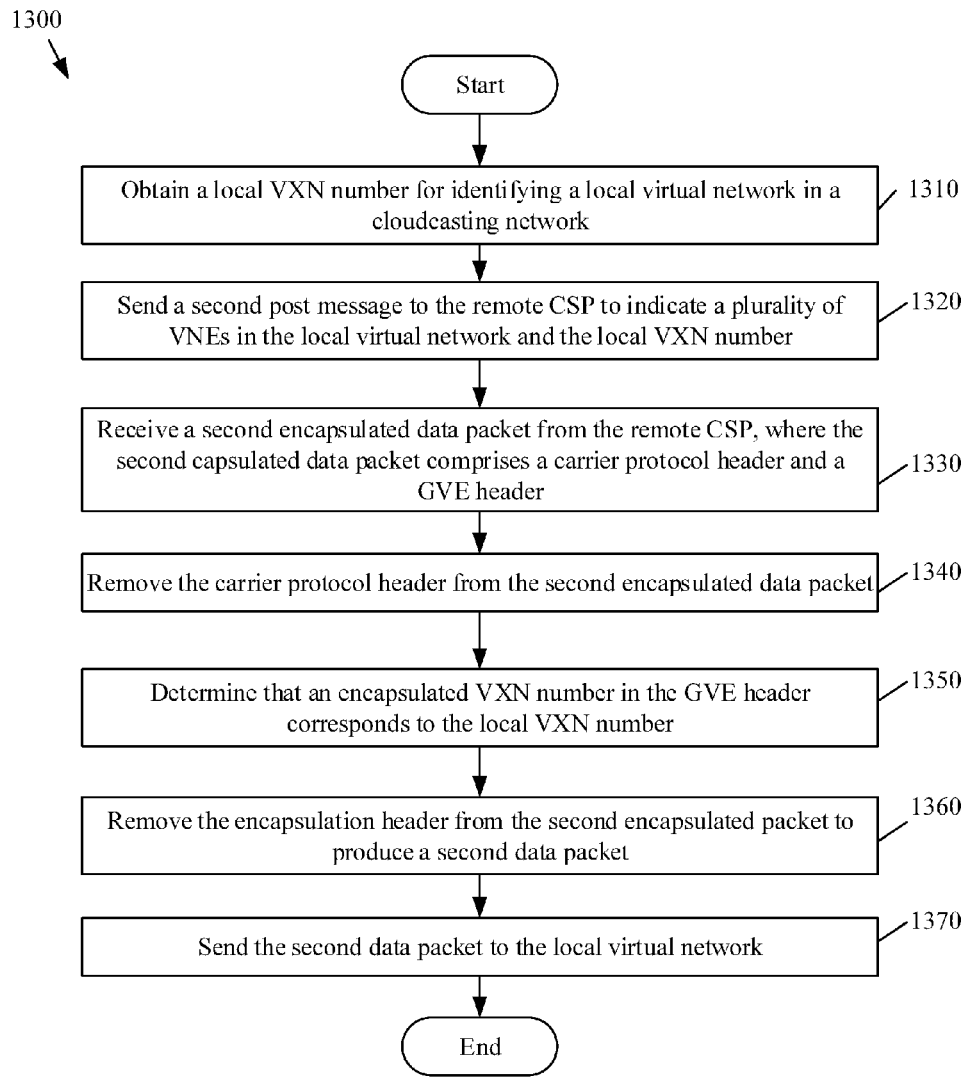
FIG. 13 is a flowchart of an embodiment of a method for performing decapsulation.

FIG. 13 is a flowchart of an embodiment of method 1300 for performing decapsulation. The method 1300 is implemented by a local CSP such as the CSPs 120, 621, and 622 and the NE 200 in a cloudcasting network such as the network systems 100 and 600. The method 1300 employs similar mechanisms as the methods 400 and 700. The method 1300 is implemented after the local CSP registered with a CRP such as the CRP 110 by employing the method 300. For example, the local CSP obtained information associated with other CSPs in the network such as the network addresses of the other CSPs and corresponding attached virtual networks such as the VXNs 140, 641, and 642. At step 1310, a local VXN number is obtained for identifying a local virtual network in the cloudcasting network, where the local virtual network is attached to the local CSP. At step 1320, a second post message is sent to the remote CSP to indicate a plurality of VNEs in the local virtual network and the local VXN number. The second post message is similar to the first post message sent in the step 710 and the second post message sent in the step 720.

At step 1330, a second encapsulated data packet similar to the transport packets 440, 1000, and 1100 is received from the remote CSP. The second encapsulated data packet comprises a carrier protocol header similar to the carrier protocol headers 410 and 1081 and a GVE header similar to the GVE headers 420, 500, and 1082. At step 1340, the carrier protocol header is removed from the second encapsulated data packet. At step 1350, a determination is made that an encapsulated VXN number in the GVE header corresponds to the local VXN number. At step 1360, the GVE header is removed from the second encapsulated data packet to produce a second data packet similar to the user data packets 430 and 1085. At step 1370, the second data packet is sent to the local virtual network.

Figure 14:
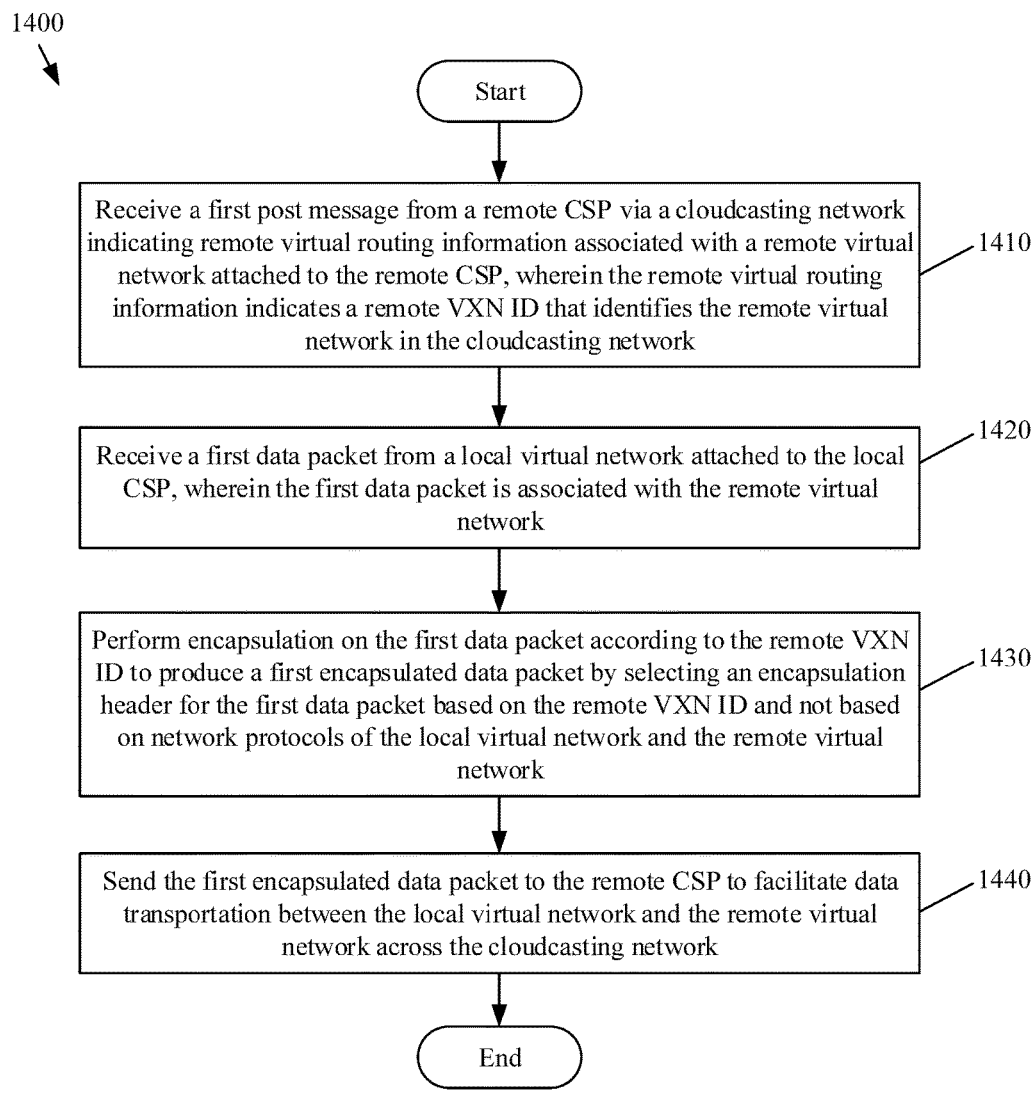
FIG. 14 is a flowchart of another embodiment of a method for performing encapsulation.

FIG. 14 is a flowchart of another embodiment of method 1400 for performing encapsulation. The method 1400 is implemented by a local CSP such as the CSPs 120, 621, and 622 and the NE 200 in a cloudcasting network such as the network systems 100 and 600. The method 1400 employs similar mechanisms as the methods 400, 700, and 1200. The method 1400 is implemented after the local CSP registers with a CRP such as the CRP in the cloudcasting network by employing the method 300. At step 1410, a first post message is received from a remote CSP via the cloudcasting network. The first post message indicates remote virtual routing information associated with a remote virtual network similar to the VXNs 140, 641, and 642 attached to the remote CSP. The remote virtual routing information indicates a remote VXN ID (e.g., VXN number and/or VXN name) that identifies the remote virtual network in the cloudcasting network and a plurality of VNEs similar to the VNEs 643 and 644 in the remote virtual network.

At step 1420, a first data packet similar to the user data packets 430 and 1085 is received from a local virtual network attached to the local CSP. The first data packet is associated with the remote virtual network. For example, the first data packet indicates a destination address corresponding to one of the VNEs in the remote virtual network.

At step 1430, encapsulation is performed on the first data packet according to the remote VXN ID to produce a first encapsulated data packet by selecting an encapsulation header based on the remote VXN ID and not based on network protocols of the local virtual network and the remote virtual network. The local virtual network protocol and the remote virtual network protocol may be IPv4, IPv6, Ethernet, VXLAN, VXLAN-GPE, NVGRE, MPLS, and/or LISP. The encapsulation is a GVE. The local CSP may further perform other encapsulations such as a carrier protocol encapsulation. At step 1440, the first encapsulated data packet is sent to the remote CSP to facilitate data transportation between the local virtual network and the remote virtual network across the cloudcasting network.

Figure 15:
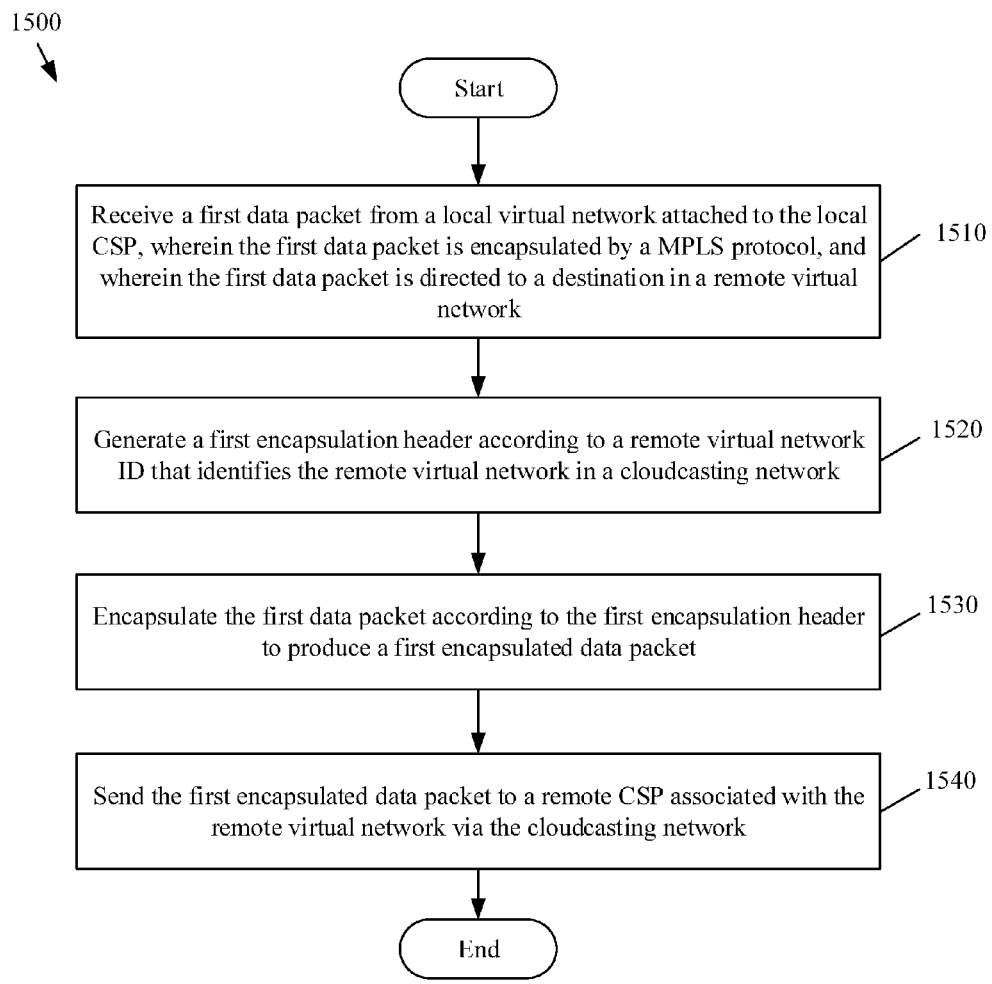
FIG. 15 is a flowchart of another embodiment of a method for performing encapsulation.

FIG. 15 is a flowchart of another embodiment of method 1500 for performing encapsulation. The method 1500 is implemented by a local CSP such as the CSPs 120, 621, and 622 and the NE 200 in a cloudcasting network such as the network systems 150 and 600. The method 1500 employs similar mechanisms as the methods 400, 700, 1200, and 1400. The method 1500 is implemented after the local CSP registers with a CRP such as the CRP 110 and exchanges remote virtual routing information with other CSPs in the cloudcasting network by employing the method 300. At step 1510, a first data packet similar to the user data packets 430 and 1085 is received from a local virtual network attached to the local CSP. The first data packet is encapsulated by a MPLS protocol. The first data packet is directed to a destination in a remote virtual network such as the VXNs 140, 641, and 642. At step 1520, a first encapsulation header such as the GVE headers 420, 500, and 1082 is generated according to a remote virtual network ID (e.g., VXN number and/or VXN name) that identifies the remote virtual network in the cloudcasting network. At step 1530, the first data packet is encapsulated according to the first encapsulation header to produce a first encapsulated data packet similar to the transport packets 440, 1000, and 1100. At step 1540, the first encapsulated data packet is sent to a remote CSP associated with the remote virtual network via the cloudcasting network.

The following table compares GVE with several encapsulation protocols including VXLAN, VxLN-GPE, NVGRE, and MPLS in terms of header size, carrier protocol, payload protocol, virtual network size, associated control protocol, and IETF request for comments (RFC) status:

TABLE 1

Comparisons of Encapsulation Protocols

| | VXLAN | VXLAN-GPE | NVGRE | MPLS | GVE |
|---|---|---|---|---|---|
| Header Size | 8 octets | 8 octets | 8 octets | 4 octets | 4 octets |
| Carrier protocol | UDP | UDP | IP | Ethernet, IP | Ethernet, IP MPLS |
| Payload protocol | Ethernet | Any (Ethernet, IP, etc) | Ethernet | Any (Ethernet, IP, etc) | Any (Ethernet, IP, etc) |
| Virtual network size | 24 bit | 24 bit | 24 bit | 20 bit | 28 bit |
| Associated control protocol | NA | NA | NA | LDP, BGP | CCC |
| Associated RFC documents | Yes | No | No | Yes | No |

As shown, GVE provides several benefits when compared to the other encapsulation protocols. For example, GVE may be more efficient for hardware processing since GVE comprises a smaller header (e.g., about 4 octets) than the other encapsulation protocols (e.g., about 8 octets). In addition, since GVE does not employ UDP, no checking of port number is required. GVE is more flexible since GVE supports any types of carrier and payload protocols by communicating the carrier and payload protocols via the CCC. Further, GVE may support more virtual networks since the GVE header allows up to twenty-eight bits of VXN number and thus supports up to about 268 millions of virtual networks.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by network element (NE) configured as a local cloud switch point (CSP), the method comprising:
   receiving, via a receiver at the NE, a first post message from a remote CSP via a cloudcasting network, the first post message indicating remote virtual routing information associated with a remote virtual network attached to the remote CSP, and the remote virtual routing information indicating a remote virtual extensible network (VXN) identifier (ID) that identifies the remote virtual network in the cloudcasting network;

receiving, via the receiver, a first data packet from a local virtual network attached to the local CSP at the NE after receiving the first post message, wherein the first data packet is associated with the remote virtual network;

performing, via a processor of the NE, encapsulation on the first data packet to produce a first encapsulated data packet by selecting an encapsulation header for the first data packet based on the remote VXN ID and independent of network protocols of the local virtual network and the remote virtual network; and sending, via a transmitter at the NE, the first encapsulated data packet to the remote CSP to facilitate data transportation between the local virtual network and the remote virtual network across the cloudcasting network.

2. The method of claim 1, wherein the remote virtual routing information further indicates a plurality of virtual network elements (VNEs) in the remote virtual network, and wherein the method further comprises:

generating, via the processor, a mapping between the remote CSP and the remote virtual routing information of the remote virtual network received from the first post message;

determining, via the processor, that a destination of the first data packet corresponds to a first VNE of the plurality of VNEs in the remote virtual network according to the remote virtual routing information in the mapping; and obtaining, via the processor, the remote VXN ID from the mapping for performing the encapsulation after determining that the destination corresponds to the first VNE.

3. The method of claim 1, wherein performing the encapsulation on the first data packet comprises:

generating a generic virtual extensible network encapsulation (GVE) header according to the remote VXN ID of the remote virtual network; and encapsulating the first data packet with the GVE header to produce the first encapsulated data packet.

4. The method of claim 3, wherein the GVE header comprises a VXN ID field indicating the VXN ID of the remote virtual network, and wherein the VXN ID field comprises a length of twenty-eight bits.

5. The method of claim 1, further comprising:

generating, via the processor, a carrier protocol header according to a network address of the remote CSP and a carrier protocol of the cloudcasting network; and encapsulating, via the processor, the first encapsulated data packet with the carrier protocol header prior to sending the first encapsulated data packet to the remote CSP.

6. The method of claim 5, wherein the carrier protocol corresponds to an Ethernet protocol, an Internet protocol (IP), or a multiprotocol label switching (MPLS) protocol.

7. The method of claim 1, further comprising:

receiving, via the receiver, a second encapsulated data packet from the remote CSP, wherein the second encapsulated data packet comprises an encapsulation header indicating an encapsulated VXN ID corresponding to a local VXN ID of the local virtual network;

removing, via the processor, the encapsulation header from the second encapsulated data packet to produce a second data packet; and sending, via the transmitter, the second data packet to the local virtual network.

8. The method of claim 7, further comprising sending, via the transmitter, a second post message to the remote CSP to indicate a plurality of virtual network elements (VNEs) in the local virtual network and the local VXN ID prior to receiving the second encapsulated data packet, wherein a destination of the second data packet corresponds to one of the VNEs in the local virtual network.

9. The method of claim 1, wherein the first data packet is an Internet protocol version four (IPv4) packet, an IP version six (IPv6) packet, a virtual extensible local area network (VXLAN) packet, a VXLAN-generic protocol extension (VXLAN-GPE) packet, a generic routing encapsulation (NVGRE) packet, a multiprotocol label switching (MPLS) packet, or a locator/identifier separation protocol (LISP) packet.

10. A computer program product comprising computer executable instructions stored on a non-transitory computer readable medium such that when executed by a processor cause a local cloud switch point (CSP) to:

receive, via a receiver, a first post message from a remote CSP via a cloudcasting network, the first post message indicating a remote virtual network identifier (ID) that identifies a remote virtual network attached to the remote CSP;

receive, via the receiver, a first data packet from a local virtual network attached to the local CSP after receiving the first post message, the first data packet being directed to a destination in the remote virtual network;

generate a first encapsulation header according to the remote virtual network ID indicated in the first post message;

encapsulate the first data packet according to the first encapsulation header to produce a first encapsulated data packet; and send, via a transmitter, the first encapsulated data packet to the remote CSP associated with the remote virtual network via the cloudcasting network.

11. The computer program product of claim 10, wherein the first post message comprises virtual routing information of the remote virtual network indicating the remote virtual network ID and a plurality of virtual network elements (VNEs) in the remote virtual network, and wherein the computer executable instructions when executed by the processor further cause the local CSP to:

generate a mapping between the remote CSP and the virtual routing information of the remote virtual network received from the route message;

determine that the destination corresponds to a first VNE of the plurality of VNEs in the remote virtual network according to the virtual routing information in the mapping; and obtain the remote virtual network ID from the mapping for generating the first encapsulation header after determining that the destination corresponds to the first VNE.

12. The computer program product of claim 11, wherein the computer executable instructions when executed by the processor further cause the local CSP to:

generate a carrier protocol header according to a network address of the remote CSP and a carrier protocol of the cloudcasting network; and encapsulate the first encapsulated data packet with the carrier protocol header prior to sending the first encapsulated data packet to the remote CSP.

13. The computer program product of claim 10, wherein the carrier protocol is independent of a network layer protocol of the local virtual network, and wherein the network layer protocol comprises a multiprotocol label switching (MPLS) protocol.

14. The computer program product of claim 10, wherein the local virtual network, the remote virtual network, and the cloudcasting network are associated with different physical networks, and wherein the local virtual network and the remote virtual network correspond to portions of a common virtual network.

15. The computer program product of claim 10, wherein the computer executable instructions when executed by the processor further cause the local CSP to:
   send, via the transmitter, a second post message to the remote CSP to indicate virtual routing information of the local virtual network, wherein the virtual routing information indicates a local virtual network ID that identifies the local virtual network in the cloudcasting network;
   receive, via the receiver, a second encapsulated data packet from the remote CSP, wherein the second encapsulated data packet comprises a second encapsulation header indicating an encapsulated virtual network ID;
   determine that the encapsulated virtual network ID corresponds to the local virtual network ID of the local virtual network;
   remove the encapsulation header from the second encapsulated data packet to produce a second data packet; and
   send, via the transmitter, the second data packet to the local virtual network according to the determining of the encapsulated virtual network ID.

16. A network element (NE) configured to implement a local cloud switch point (CSP), the NE comprising:
   a receiver configured to:
      receive a first post message from a first remote CSP via a cloudcasting network, the first post message indicating remote virtual routing information associated with a first remote virtual network attached to the first remote CSP, and the remote virtual routing information indicating a first remote virtual extensible network (VXN) identifier (ID) that identifies the first remote virtual network in the cloudcasting network; and
      receive a first data packet from a first local virtual network attached to the local CSP after receiving the first post message, the first data packet being associated with the first remote virtual network;
   a processor coupled to the receiver and configured to:
      determine that the first data packet is associated with the first remote virtual network according to the remote virtual routing information; and
      perform a first encapsulation on the first data packet according to the first remote VXN ID to produce a first encapsulated data packet; and
   a transmitter coupled to the processor and configured to send the first encapsulated data packet to the first remote CSP.

17. The NE of claim 16, further comprising a memory coupled to the processor and configured to store a mapping between the first remote CSP and the remote virtual routing information received from the first post message, wherein the remote virtual routing information further indicates a plurality of virtual network elements (VNEs) in the first remote virtual network, and wherein the processor is further configured to:
   determine that a destination of the first data packet corresponds to a first VNE of the VNEs in the first remote virtual network according to the remote virtual routing information in the mapping; and
   obtain the first remote VXN ID from the mapping for performing the first encapsulation after determining that the destination corresponds to the first VNE.

18. The NE of claim 16, wherein the receiver is further configured to receive a second data packet from a second local virtual network attached to the local CSP, wherein the second data packet is destined to a second remote virtual network attached to a second remote CSP in the cloudcasting network, wherein the second remote virtual network is identified by a second remote VXN ID in the cloudcasting network, wherein the second data packet and the first data packet comprise different network protocols, wherein the processor is further configured to perform a second encapsulation on the second data packet according to the second remote VXN ID to produce a second encapsulated data packet, wherein the first encapsulation and the second encapsulation are associated with a same encapsulation type, and wherein the transmitter is further configured to send the second encapsulated data packet to the second remote CSP.

19. The NE of claim 16, wherein the receiver is further configured to receive a third encapsulated data packet from the first remote CSP, wherein the third encapsulated data packet comprises an encapsulation header indicating an encapsulated VXN ID corresponding to a local VXN ID of the first local virtual network, wherein the processor is further configured to remove the encapsulation header from the third encapsulated packet to produce a third data packet, and wherein the transmitter is further configured to send the third data packet to the first local virtual network.

20. The NE of claim 19, wherein the processor is further configured to obtain the local VXN ID for identifying the first local virtual network in the cloudcasting network, wherein the transmitter is further configured to send a second post message to the first remote CSP to indicate a plurality of virtual network elements (VNEs) in the first local virtual network and the local VXN ID prior to receiving the second encapsulated data packet, and wherein a destination of the second data packet corresponds to one of the VNEs in the first local virtual network.

* * * * *